US012798181B2

(12) United States Patent
Briden et al.

(10) Patent No.: US 12,798,181 B2
(45) Date of Patent: Nov. 17, 2026

(54) THREE-DIMENSIONAL PRINTING OF SCREENS

(71) Applicant: Peridot Print LLC, Palo Alto, CA (US)

(72) Inventors: John Briden, Palo Alto, CA (US); Emre Discekici, San Diego, CA (US); Oriol Vaquer Arnau, Sant Cugat del Valles (SE)

(73) Assignee: Peridot Print LLC, Palo Alto, CA (US)

( * ) Notice: Subject to any disclaimer, the term of this patent is extended or adjusted under 35 U.S.C. 154(b) by 46 days.

(21) Appl. No.: 18/682,921

(22) PCT Filed: Sep. 1, 2021

(86) PCT No.: PCT/US2021/048615
§ 371 (c)(1),
(2) Date: Feb. 11, 2024

(87) PCT Pub. No.: WO2023/033816
PCT Pub. Date: Mar. 9, 2023

(65) Prior Publication Data
US 2024/0342987 A1 Oct. 17, 2024

(51) Int. Cl.
*B29C 64/165* (2017.01)
*B29C 64/393* (2017.01)
(Continued)

(52) U.S. Cl.
CPC .......... *B29C 64/165* (2017.08); *B29C 64/393* (2017.08); *B33Y 50/02* (2014.12);
(Continued)

(58) Field of Classification Search
CPC ..... B29C 64/165; B29C 64/393; B33Y 50/02; B33Y 80/00; B29K 2995/0094; B29K 2995/0097; B29L 2031/737
(Continued)

(56) References Cited

U.S. PATENT DOCUMENTS 4,382,884 A 5/1983 Rohringer et al.
5,490,962 A 2/1996 Cima et al.
(Continued)

FOREIGN PATENT DOCUMENTS

AT A144297 A 1/1999
CN 1922247 A 2/2007
(Continued)

OTHER PUBLICATIONS

Lasman, Henry R., "Foamed Plastics", edited by Shanghai Institute of Light Industry, pp. 1-14, published by Shanghai Science and Technology Compilation Center, Apr. 1966.
(Continued)

*Primary Examiner* — Tahseen Khan
(74) *Attorney, Agent, or Firm* — Law Offices of Michael Dryja; Michael Dryja

(57) ABSTRACT

Disclosed herein is a method of 3D printing a screen, such as a screen for molded fibre product fabrication, comprising a plurality of apertures through the 3D printed body, wherein the diameter or width of at least one of the apertures is 0.5 mm or less. Also described herein is a screen obtainable by the method and a non-transitory computer readable medium on which is stored instructions that cause a processor to perform the method.

16 Claims, 3 Drawing Sheets

(51) Int. Cl.
*B29L 31/00* (2006.01)
*B33Y 50/02* (2015.01)
*B33Y 80/00* (2015.01)

(52) U.S. Cl.
CPC ...... *B33Y 80/00* (2014.12); *B29K 2995/0094* (2013.01); *B29K 2995/0097* (2013.01); *B29L 2031/737* (2013.01)

(58) Field of Classification Search
USPC .......................................................... 428/131
See application file for complete search history.

(56) References Cited

U.S. PATENT DOCUMENTS

| | | | |
|---|---|---|---|
| 6,454,811 | B1 | 9/2002 | Sherwood et al. |
| 6,620,356 | B1 | 9/2003 | Wong et al. |
| 7,094,371 | B2 | 8/2006 | Lo |
| 8,273,368 | B2 | 9/2012 | Ambrosio et al. |
| 8,431,623 | B2 | 4/2013 | Shim et al. |
| 8,660,825 | B2 | 2/2014 | Kumar |
| 10,099,166 | B2 | 10/2018 | Sakashita et al. |
| 10,183,477 | B2 | 1/2019 | Dean et al. |
| 12,227,659 | B2 | 2/2025 | Discekici et al. |
| 12,280,543 | B2 | 4/2025 | Discekici et al. |
| 12,472,682 | B2 | 11/2025 | Discekici et al. |
| 2004/0138049 | A1 | 7/2004 | Yasrebi et al. |
| 2009/0298667 | A1 | 12/2009 | Addiego et al. |
| 2013/0118377 | A1 | 5/2013 | Hamman et al. |
| 2013/0331927 | A1 | 12/2013 | Zheng et al. |
| 2014/0308600 | A1 | 10/2014 | Chochos et al. |
| 2015/0291921 | A1 | 10/2015 | Rives |
| 2016/0136728 | A1 | 5/2016 | Srivas et al. |
| 2017/0274594 | A1 | 9/2017 | Ng et al. |
| 2017/0291077 | A1 | 10/2017 | Madson et al. |
| 2018/0015663 | A1 | 1/2018 | Zhao et al. |
| 2018/0055643 | A1 | 3/2018 | Castro et al. |
| 2018/0126631 | A1 | 5/2018 | Nauka et al. |
| 2018/0133957 | A1 | 5/2018 | Ramirez Muela et al. |
| 2018/0134911 | A1 | 5/2018 | Neuman |
| 2018/0147777 | A1 | 5/2018 | Abbott et al. |
| 2018/0269174 | A1 | 9/2018 | Fathi et al. |
| 2018/0272600 | A1 | 9/2018 | Shaarawi et al. |
| 2018/0354191 | A1 | 12/2018 | Nauka et al. |
| 2019/0039296 | A1 | 2/2019 | Prasad et al. |
| 2019/0047216 | A1 | 2/2019 | Emamjomeh et al. |
| 2019/0298523 | A1 | 10/2019 | Crudden et al. |
| 2019/0375688 | A1 | 12/2019 | Lin et al. |
| 2020/0108553 | A1 | 4/2020 | Rogren |
| 2020/0171739 | A1 | 6/2020 | Dikovsky et al. |
| 2020/0283651 | A1 | 9/2020 | Wright et al. |
| 2021/0001401 | A1 | 1/2021 | Shaarawi et al. |
| 2022/0088855 | A1 | 3/2022 | Williams et al. |

FOREIGN PATENT DOCUMENTS

| | | | | |
|---|---|---|---|---|
| EP | 3287213 | A1 | 2/2018 | |
| GB | 2456502 | A | 7/2009 | |
| JP | 2016-097578 | A | 5/2016 | |
| JP | 2017-057467 | A | 3/2017 | |
| KR | 10-1019186 | B1 | 3/2011 | |
| KR | 10-2018-0129059 | A | 12/2018 | |
| WO | 2005/072785 | A1 | 8/2005 | |
| WO | 2015/108544 | A1 | 7/2015 | |
| WO | 2015/139129 | A1 | 9/2015 | |
| WO | 2017/131757 | A1 | 8/2017 | |
| WO | 2017/180118 | A1 | 10/2017 | |
| WO | 2017/196321 | A1 | 11/2017 | |
| WO | 2018/022024 | A1 | 2/2018 | |
| WO | 2018/093145 | A1 | 5/2018 | |
| WO | 2018/183803 | A1 | 10/2018 | |
| WO | 2018/206250 | A1 | 11/2018 | |
| WO | 2018/213432 | A1 | 11/2018 | |
| WO | 2019/017926 | A1 | 1/2019 | |
| WO | 2019/108288 | A1 | 6/2019 | |
| WO | 2020/264059 | A1 | 12/2020 | |
| WO | WO-2020251520 | A1 * | 12/2020 | .............. C08L 77/02 |

OTHER PUBLICATIONS

Yaqing, F., et al., "Inorganic chemical foaming agent", Auxiliary Chemistry and Technology, Jun. 30, 1997, pp. 288-291.

* cited by examiner

THREE-DIMENSIONAL PRINTING OF SCREENS

Various types of product may be fabricated from a pulp of material by molded fibre product fabrication methods. In particular, a screen that includes a body and a plurality of apertures through the body may be immersed in a slurry containing fibres, which may be referred to as pulp. The fibres may then be molded into the shape of the screen, which may be in the shape of the product to be formed. The complexity of the product shapes that can be formed depends on the accuracy with which the screen can be fabricated. During formation of the product, a vacuum may be applied through the screen which may cause the material (e.g., fibres) in the slurry to be sucked onto the screen and form into a shape that matches the shape of the screen. The material (e.g., fibres) may then be removed from the mesh and solidified by, for example, drying, to form a molded fibre product with the desired shape.

BRIEF DESCRIPTION OF THE FIGURES

Non-limiting examples will now be described with reference to the accompanying drawings in which.

DETAILED DESCRIPTION

Figure 1:
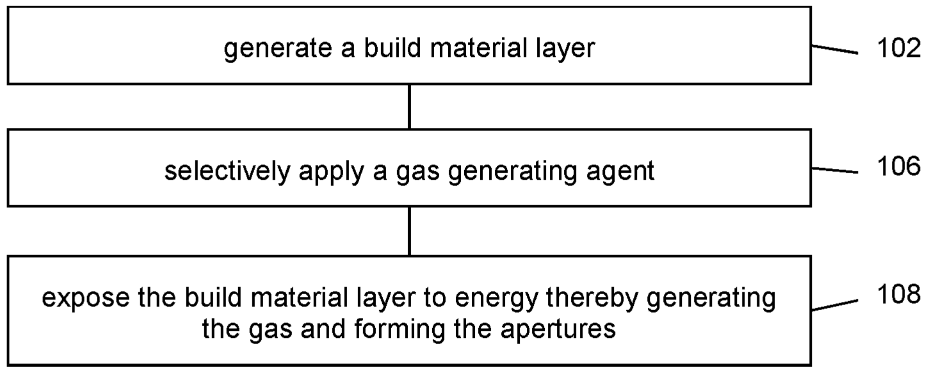
FIG. 1 is an example of a method of three-dimensionally printing a screen.

Before the present disclosure is disclosed and described, it is to be understood that this disclosure is not limited to the particular process steps and materials disclosed herein because such process steps and materials may vary somewhat. It is also to be understood that the terminology used herein is used for the purpose of describing particular embodiments. The terms are not intended to be limiting because the scope is intended to be limited by the appended claims and equivalents thereof.

It is noted that, as used in this specification and the appended claims, the singular forms “a,” “an,” and “the” include plural referents unless the context clearly dictates otherwise.

As used herein, “co-polymer” refers to a polymer that is polymerized from at least two monomers.

The average particle size may refer to a number average of the diameter of particles for spherical particles, or a number average of the volume equivalent sphere diameter for non-spherical particles. The volume equivalent sphere diameter is the diameter of a sphere having the same volume as the particle. Average particle size can be measured using a particle analyser such as the Mastersizer™ 3000 available from Malvern Panalytical. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

If a standard test is mentioned herein, unless otherwise stated, the version of the test to be referred to is the most recent at the time of filing this patent application.

As used herein, “NVS” is an abbreviation of the term “non-volatile solids”.

As used herein, the term “about” is used to provide flexibility to a numerical range endpoint by providing that a given value may be a little above or a little below the endpoint to allow for variation in test methods or apparatus. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of “about 1 wt. % to about 5 wt. %” should be interpreted to include not just the explicitly recited values of about 1 wt. % to about 5 wt. %, but also to include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

As used herein, unless otherwise stated, wt. % values are to be taken as referring to a weight-for-weight (w/w) percentage of solids in the ink composition, and not including the weight of any carrier fluid present.

Unless otherwise stated, any feature described herein can be combined with any aspect or any other feature described herein.

Methods of three-dimensional (3D) printing, a type of additive manufacturing, can be used to produce screens, which may be suitable for use in molded fibre product fabrication. These screens comprise a body and a plurality of apertures extending through the body. To fabricate some molded fibre products, it is advantageous to use a screen comprising very small apertures, for example, apertures with a diameter or width of about 0.5 mm or less. It can, in some cases, be difficult to produce apertures with a size below a threshold (for example, a diameter/width of about 0.5 mm) by three-dimensional printing methods that involve selectively combining particles of a powder layer because it can be difficult to remove the uncombined powder particles from the apertures after the printing process has been completed. Indeed, it is believed that screens comprising apertures with a diameter or width of about 0.5 mm or less cannot currently be produced by 3D printing techniques of this type, as the powder cannot be effectively removed from the apertures of such screens. For example, in 3D printing processes involving application of a fusing agent to the powder build material, the apertures may contain at least partially fused (e.g., melted) build material (e.g., polymer powder) that cannot practically be removed.

It has been found that the application of a gas generating compound that chemically reacts at an elevated temperature (e.g., the temperature to which the build material is heated during fusing of the powder particles) to generate a gas that displaces the powder enables the creation of unclogged apertures with a smaller diameter/width. Additionally, this process can produce thicker screens, which may have increased strength without detrimentally affecting the removal of uncombined (e.g., unfused) powder from the apertures. Moreover, in some examples, the chemical reaction of the gas generating compound to produce a gas is endothermic, which may contribute to a reduction in thermal bleed.

Method of 3D Printing a Screen

In an aspect, there is described herein a method of three-dimensionally (3D) printing a screen, wherein the screen comprises a body and a plurality of apertures extending through the body. FIG. 1 shows an example of a method of 3D printing a screen. The method comprises generating build material layers on a build platform (102); selectively applying a gas generating agent onto the build material layers based on a 3D object model of the screen (106); wherein the gas generating agent comprises a gas generating compound that chemically reacts at a temperature to generate a gas; and exposing the build material layers to energy to selectively treat the build material to form the body of the screen from a set of build material layers, thereby heating the gas generating compound to generate the gas and form the apertures in the screen (108). In some examples, the method may further comprise generating a 3D object model of a screen comprising a plurality of apertures with a size below a threshold.

In some examples, the gas generating agent is applied in locations of the build material that will become apertures of the screen. In some examples, the gas generating agent may be applied around the circumference of the apertures. In some examples, the gas generating agent may be applied within the central portion of the apertures. In some examples, the gas generating agent may be applied across the entire surface of the apertures.

Without wishing to be bound by theory, it is believed that the conversion of the gas generating compound into a gas creates microexplosions that force the powder build material outwards. These microexplosions may remove uncombined (e.g., unfused) powder from the apertures during the creation of a layer of the printed screen. Additionally, some of the powder build material forced out of the apertures may be combined with the powder build material that is fusing to form the body of the screen.

In some examples, the method of 3D printing may be any 3D printing method comprising exposing successive layers of a build material to energy. For example, the 3D printing method may be selective laser sintering, selective laser melting, or powder bed fusion.

In some examples, the method may comprise selectively exposing the build material layers to energy to selectively treat the build material to form the body of the screen from a set of build material layers, thereby heating the gas generating compound to generate the gas and form the apertures in the screen (108).

Figure 2:
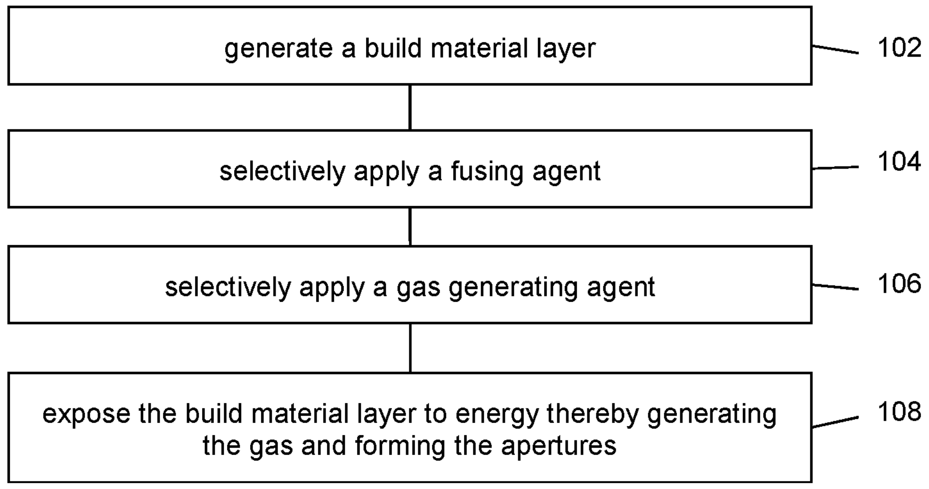
FIG. 2 is another example of a method of three-dimensionally printing a screen.

FIG. 2 shows another example method of 3D printing a screen. The method comprises generating build material layers on a build platform (102); selectively applying a fusing agent onto the build material layers based on a 3D object model of the screen (104); selectively applying a gas generating agent onto the build material layers based on the 3D object model of the screen (106); wherein the gas generating agent comprises a gas generating compound that chemically reacts at a temperature to generate a gas; and exposing the build material layers to energy to selectively treat the build material in contact with the fusing agent and form the body of the screen from a set of build material layers, thereby heating the gas generating compound to the temperature to generate the gas and form the apertures in the screen (108). In some examples, the build material layers are exposed uniformly to energy to selectively treat (e.g., fuse) the build material in contact with the fusing agent and form the body of the screen from the set of build material layers, thereby heating the gas generating compound to the temperature to generate the gas and form the apertures in the screen.

The build material, fusing agent and gas generating agent used in any of the methods described herein may be any build material, fusing agent and gas generating agent, respectively, described herein.

In some examples, the screen may be a filtration screen, for example, a screen for use in molded fibre product fabrication or any other screen used to remove particles from a liquid, such as in a pump system for a pool.

The method may comprise iteratively generating a build material layer on a build platform; selectively applying a fusing agent onto each of the build material layers based on a three-dimensional object model of the screen; selectively applying a gas generating agent onto each of the build material layers based on the three-dimensional object model of the screen; wherein the gas generating agent comprises a gas generating compound that chemically reacts at a temperature to generate a gas; and exposing each of the build material layers to energy to selectively treat the build material in contact with the fusing agent and form the body of the screen from a set of build material layers, thereby heating the gas generating compound to the temperature to generate the gas and form the apertures in the screen.

In some examples, the method may further comprise identifying apertures of the screen in the three-dimensional object model that have a size below a threshold and applying the gas generating agent at locations in the build material layers that correspond to the identified apertures. In some examples, the method may further comprise identifying the size of apertures in the three-dimensional object model of the screen; identifying apertures that have a size below a threshold and applying the gas generating agent at locations in the build material layers that correspond to the identified apertures. In some examples, the method may further comprise identifying the size of apertures in the three-dimensional object model of the screen; identifying apertures that have a size below a threshold; applying the gas generating agent at locations in the build material layers that correspond to the identified apertures; and applying a detailing agent at locations in the build material layers that correspond to apertures with a size above the threshold.

In some examples, the threshold may be a diameter or width of about 0.5 mm or less, for example, about 0.49 mm or less, about 0.48 mm or less, about 0.47 mm or less, about 0.46 mm or less, about 0.45 mm or less, about 0.44 mm or less, about 0.43 mm or less, about 0.42 mm or less, about 0.41 mm or less, about 0.4 mm or less, about 0.39 mm or less, about 0.38 mm or less, about 0.37 mm or less, about 0.36 mm or less, about 0.35 mm or less, about 0.34 mm or less, about 0.33 mm or less, about 0.32 mm or less, about 0.31 mm or less, about 0.3 mm or less, about 0.29 mm or less, about 0.28 mm or less, about 0.27 mm or less, about 0.26 mm or less, about 0.25 mm or less, about 0.24 mm or less, about 0.23 mm or less, about 0.22 mm or less, about 0.21 mm or less, about 0.2 mm or less, about 0.19 mm or less, about 0.18 mm or less, about 0.17 mm or less, about 0.16 mm or less, about 0.15 mm or less, about 0.14 mm or less, about 0.13 mm or less, about 0.12 mm or less, or about 0.11 mm or less, or about 0.1 mm or less. In some examples, the threshold may be a diameter or width of at least about 0.1 mm, for example, at least about 0.11 mm, at least about 0.12 mm, at least about 0.13 mm, at least about 0.14 mm, at least about 0.15 mm, at least about 0.16 mm, at least about 0.17 mm, at least about 0.18 mm, at least about 0.19 mm, at least about 0.2 mm, at least about 0.21 mm, at least about 0.22 mm, at least about 0.23 mm, at least about 0.24 mm, at least about 0.25 mm, at least about 0.26 mm, at least about 0.27 mm, at least about 0.28 mm, at least about 0.29 mm, at least about 0.3 mm, at least about 0.31 mm, at least about 0.32 mm, at least about 0.33 mm, at least about 0.34 mm, at least about 0.35 mm, at least about 0.36 mm, at least about 0.37 mm, at least about 0.38 mm, at least about 0.39 mm, at least about 0.4 mm, at least about 0.41 mm, at least about 0.42 mm, at least about 0.43 mm, at least about 0.44 mm, at least about 0.45 mm, at least about 0.46 mm, at least about 0.47 mm, at least about 0.48 mm, at least about 0.49 mm, or at least about 0.5 mm. In some examples, the threshold may be a diameter or width of from about 0.1 mm to about 0.5 mm, for example, about 0.49 mm to about 0.11 mm, about 0.48 mm to about 0.12 mm, about 0.47 mm to about 0.13 mm, about 0.46 mm to about 0.14 mm, about 0.45 mm to about 0.15 mm, about 0.44 mm to about 0.16 mm, about 0.43 mm to about 0.17 mm, about 0.42 mm to about 0.18 mm, about 0.41 mm to about 0.19 mm, about 0.4 mm to about 0.2 mm, about 0.39 mm to about 0.21 mm, about 0.38 mm to about 0.22 mm, about 0.37 mm to about 0.23 mm, about 0.36 mm to about 0.24 mm, about 0.35 mm to about 0.25 mm, about 0.34 mm to about 0.26 mm, about 0.33 mm to about 0.27 mm, about 0.32 mm to about 0.28 mm, about 0.31 mm to about 0.29 mm, or about 0.3 mm to about 0.29 mm.

In some examples, the apertures may have a regular shape or an irregular shape, wherein apertures with a regular shape may be circular or oval. In some examples, the width of the aperture is the shortest distance from one wall of the aperture through the centre of the aperture to the opposite wall. In some examples, the gas produced from the gas generating agent expands and encounters forces from the surrounding powder that induce the formation of irregularly shaped apertures. Thus, although, in the absence of external forces, the gas would expand spherically, the surrounding powder and/or fused or partially fused powder may affect the shape of the expanding gas bubble, affecting the shape of the apertures formed. The shape of the apertures is controlled by the 3D object model, the design of which may be determined with these effects taken account when designing the pattern for application of the gas generating agent.

In some examples, generating build material layers on a build platform may comprise spreading a build material onto the surface of a build platform. In some examples, the build platform may be lowered between each layer of build material to allow a new layer of build material to be spread onto the surface of the previous layer of build material. In some examples, the build platform may comprise a part (e.g., the base) of a build chamber.

In some examples, the build material may be any build material described herein. The build material may be a powder, for example, any powder suitable for use in a 3D printer. In some examples, the powder is a polymer powder.

In some examples, selectively applying an agent onto the build material layer may comprise selectively jetting the agent onto the build material layer. In some examples, the gas generating agent, the fusing agent or both the gas generating agent and the fusing agent may be selectively jetted onto the build material layer.

In some examples, the fusing agent and/or the gas generating agent may be jetted onto the build material by using fluid jet printheads. The fluid jet printhead may be any type of fluid jet printhead, such as a thermal printhead or a piezoelectric printhead. The amount of gas generating agent applied to the build material may be calibrated based on the concentration of the gas generating agent, the size of the apertures in the screen and/or the distance between apertures in the screen (e.g., the distance between the centres of adjacent apertures), among other factors. In some examples, the amount of gas generating agent applied to the build material may be calibrated based on the concentration of the gas generating agent and/or the size of the apertures in the screen. Similarly, the amount of fusing agent used can be calibrated based on the concentration of the radiation absorber in the fusing agent, the level of fusing desired for the build material and other factors. In some examples, the amount of fusing agent applied can be sufficient to contact the radiation absorber with the entire layer of build material, for example, by penetrating the entire thickness of the build material layer. Thus, the fusing agent can heat throughout the entire layer of the build material so that the layer can, for example, coalesce and bond to the previous layer of build material. After forming a solid (e.g., fused) layer of the build material, a new layer of build material (e.g., loose powder) can be formed, either by lowering the build platform or by raising the height of the applicator (e.g., a roller) and applying (e.g., rolling) a new layer of build material.

In some examples, the method may further comprise determining the amount of gas generating agent, fusing agent, or both to apply to the build material layers based on the three-dimensional object model of the screen. In some examples, the amount of gas generating compound applied may be dependent on the thermal mass of the body of the screen. In some examples, the amount of gas generating compound applied may depend on the screen thickness (e.g., the number of layers of build material used to form the screen) and/or the web thickness (W; e.g., the distance between apertures). In some examples, the thicker the screen, the more gas generating compound applied for a particular aperture size. In some examples, the thicker the web, the more gas generating compound applied for a particular aperture size.

In some examples, exposing the build material layers to energy to selectively treat the build material in contact with the fusing agent and form the body of the screen from a set of build material layers comprises exposing the build material layers to energy to selectively fuse, coalesce, bind or cure the build material in contact with the fusing agent and form the body of the screen from a set of build material layers. In some examples, the build material layers may be exposed to energy to selectively fuse the build material in contact with the fusing agent and form the body of the screen from a set of build material layers.

In some examples, exposing the build material layers to energy may comprise exposing the build material layers to radiation energy to elevate the temperature of the build material layers. In some examples, exposing the build material layers to energy may heat the build material and the gas generating compound applied thereon to a temperature at which the gas generating compound chemically reacts to generate a gas. The temperature at which the gas generating compound chemically reacts may be at or below (e.g., up to 100° C. below or up to 60° C. below) the melting or softening point of the build material, that is, the temperature at which the build material fuses, coalesces, binds together or is cured. Without wishing to be bound by theory, it is believed that the pressure created when the gas is generated displaces the powder build material from the area allowing an aperture to be created through the body of the screen.

In some examples, exposing the build material layers to energy may comprise irradiating the build material layers, for example, with a lamp. Suitable lamps may include infrared lamps, halogen lamps, and LED lamps. The lamp may be a stationary lamp or a lamp that moves during the 3D printing process. Such a lamp may irradiate the build material layer for a time period that depends on the amount of exposure to energy needed to coalesce/fuse the build material layer and generate the gas from the gas generating compound. This may selectively heat the build material in contact with the fusing agent to a temperature that melts or softens the build material whilst also heating the gas generating compound to the temperature at which it chemically reacts to generate a gas.

In some examples, the lamp may be matched with the radiation absorber in the fusing agent so that the lamp emits wavelengths of light that match the peak absorption wavelengths of the radiation absorber efficiently heating and coalescing the particles of the build material with the fusing agent printed thereon, while the build material without the fusing agent remains at a lower temperature. Although the build material without the fusing agent remains at a lower temperature even when irradiated, the gas generating compound is heated enough to reach the temperature at which a gas is generated. The gas generating compound may be heated directly by the energy source and/or by the heat absorbed by the surrounding build material that is in contact with the fusing agent.

Depending on the amount of radiation absorber present in the build material, the absorbance of the radiation absorber, the preheat temperature, the melting or softening point of the build material, and the temperature at which the gas is generated, an appropriate amount of irradiation can be supplied from the lamp. In some examples, the lamp can irradiate individual layers for from about 0.5 to about 10 seconds per pass.

In some examples, the build material may be preheated to a temperature below the melting or softening point of the build material. In some examples, the build material may be preheated to a temperature of up to 50° C. below (e.g., about 10° C. to 30° C. below) the melting or softening point of the build material. In some examples, the preheating temperature may be about 180° C. and the build material can optionally be polyamide 11 powder. Preheating of the build material may be accomplished with a lamp or lamps, an oven, a heated build platform or another type of heater. In some examples, the build material can be heated to a substantially uniform temperature, for example, a uniform temperature. The preheating temperature may be a temperature below the temperature at which the gas is generated from the gas generating compound such that the gas is generated on exposure of the build material layers to energy.

A 3D object model can in some examples be created by using computer aided design (CAD) software. 3D object models can be stored in any suitable file format. The 3D object model can define the three-dimensional shape of the body of the screen and the three-dimensional shape of apertures through at least a portion of the 3D printed screen. Other information may also be included, such as structures to be formed of additional different materials or colour data for printing the screen with various colours at different locations on the screen. The 3D object model may also include features or materials specifically related to jetting fluids on layers of build material, such as the desired amount of fluid to be applied to a given area. This information may be in the form of a droplet saturation, for example, which can instruct a 3D printing system to jet a certain number of droplets of fluid into a specific area and/or to vary the size of the droplets to alter the amount of, for example, the gas generating compound applied in each droplet of gas generating agent. This can allow the 3D printing system to finely control radiation absorption, cooling, colour saturation, concentration of the gas generating compound, and so on. All this information can be contained in a single 3D object file or a combination of multiple files. The 3D printed screen can be made based on the 3D object model. As used herein, "based on the 3D object model" can refer to printing using a single 3D object model file or a combination of multiple 3D object models that together define the article. In certain examples, software can be used to convert a 3D object model to instructions for a 3D printer to form the article by building up individual layers of build material.

In an example of the 3D printing process, a thin layer of powder (e.g., polymer powder) can be spread on a build platform to form a powder bed. At the beginning of the process, the powder bed can be empty because no build material has been spread at that point. For the first layer, the powder particles can be spread onto an empty build platform. Thus, generating build material layers on a build platform includes spreading powder particles onto the empty build platform for the first layer. In other examples, a number of initial layers of powder build material can be spread before the printing begins. A fluid jet printing head, such as an inkjet print head, can then be used to apply (e.g., print) a fusing agent including a radiation absorber over portions of the build material corresponding to a thin layer of the 3D screen to be formed, for example, corresponding to a thin layer of the body of the screen to be formed. Another fluid jet printing head can be used to apply a gas generating agent over portions of the build material corresponding to a portion or all of a thin layer of the apertures to be formed through the body of the screen. Then the build material can be exposed to electromagnetic energy, e.g., typically the entire bed. The electromagnetic energy can include light, infrared radiation, and so on. The radiation absorber can absorb more energy from the electromagnetic energy than the build material and/or the build material printed with the gas generating agent. The absorbed light energy can be converted to thermal energy, causing the portions of the build material on which the fusing agent has been applied to soften and fuse together into a formed layer. The electromagnetic energy and/or the thermal energy (absorbed by the radiation absorber) may also cause the gas generating compound to chemically react, generating the gas. After the first layer is formed, a new thin layer of build material powder can be spread over the build platform and the process can be repeated to form additional layers until a complete 3D printed screen is printed. Thus, "generating build material layers on a build platform" also includes spreading layers of build material particles over the loose particles and fused layers beneath the new layer of build material particles.

In certain examples, the 3D printed screen can be formed with apertures throughout the 3D printed article, or with apertures in any desired location within the 3D printed screen. In one example, the 3D printed screen can have apertures in the central portion of the screen and a solid exterior. For example, the 3D printed screen can be designed to have a solid exterior portion without any gas generating agent applied during formation of the solid exterior portion and a central portion where the gas generating agent is applied to aperture locations during formation of the apertures in the central portion. In some examples, a portion of the body of the screen can have apertures through the body while other portions are solid, for example, to provide an attachment portion of the screen for attaching the screen to, for example, a fibre molding machine. In a fibre molding machine, the screen may be attached to a supporting form die in the fibre molding machine. In some examples, the screen may be attached directly to the fibre molding machine, without the need for a supporting form.

In some examples, the method may further comprise selectively applying a detailing agent onto the build material layers based on the three-dimensional object model of the screen. The detailing agent may comprise a detailing compound that reduces the temperature of the build material onto which the detailing agent is applied. Thus, the maximum temperature reached by the build material during the exposure to energy may be lower in areas where the detailing agent has been applied than in areas where the fusing agent has been applied. In some examples, the detailing agent controls (and/or reduces) the temperature of the build material by evaporative cooling. In some examples, the application of the detailing agent may control the temperature of the build material by means of at least partial, or complete, evaporation of the detailing compound, which evaporatively cools the build material. In some examples, the detailing agent is applied to the build material in locations where fusing of the build material is not desired, for example, along the edges of areas where the fusing agent is applied. This may give the fused layer a clean, defined edge where the fused polymer particles end and the adjacent polymer particles remain unfused. In other examples, the detailing agent may be applied in the same area as the fusing agent is applied to control the temperature in the area of the build material to be fused. In some examples, some areas of the build material to be fused may tend to overheat. To control the temperature and avoid overheating (which may lead to melting and slumping of the build material), the detailing agent may be applied to these areas.

In some examples, the detailing agent and the gas generating agent may both be applied in locations of the build material that will become apertures of the screen. In some examples, the detailing agent may be applied around the circumference of the apertures and the gas generating agent may be applied within the central portion of the apertures. In some examples, the gas generating agent may be applied around the circumference of the apertures and the detailing agent may be applied within the central portion of the apertures. In some examples, the detailing agent and the gas generating agent may both be applied across the entire surface of the apertures.

Figure 3:
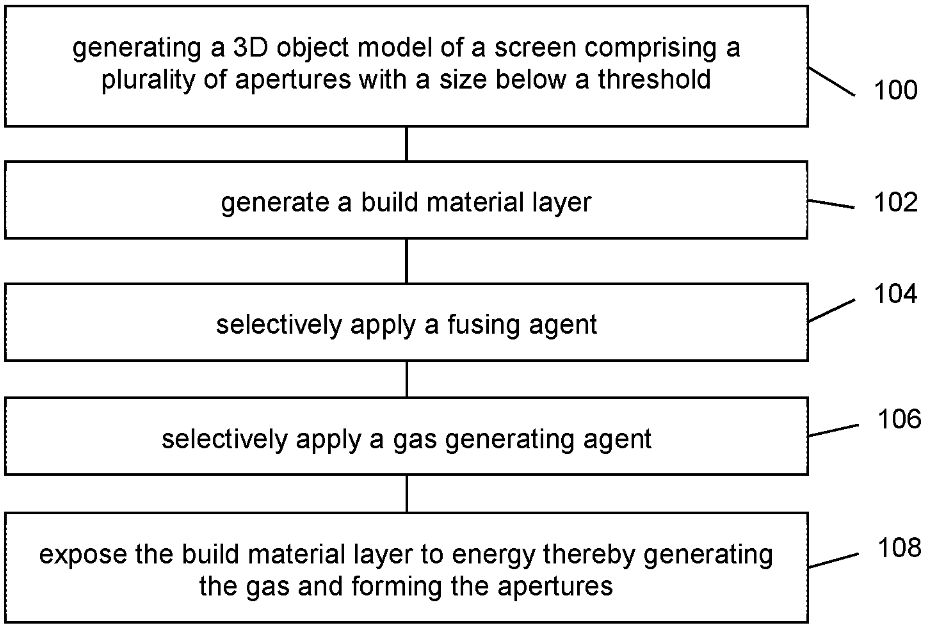
FIG. 3 is another example of a method of three-dimensionally printing a screen.

FIG. 3 shows another example method of 3D printing a screen. The method comprises generating a 3D object model of a screen comprising a plurality of apertures with a size below a threshold (100); generating build material layers on a build platform (102); selectively applying a fusing agent onto the build material layers based on a 3D object model of the screen (104); selectively applying a gas generating agent onto the build material layers based on the 3D object model of the screen (106); wherein the gas generating agent comprises a gas generating compound that chemically reacts at a temperature to generate a gas; and exposing the build material layers to energy to selectively treat the build material in contact with the fusing agent and form the body of the screen from a set of build material layers, thereby heating the gas generating compound to the temperature to generate the gas and form the apertures in the screen (108). In some examples, the 3D object model of a screen comprising a plurality of apertures with a size below a threshold may be generated by using CAD software.

Gas Generating Agent

The gas generating agent comprises a gas generating compound that chemically reacts at an elevated temperature to generate a gas. As used herein, "chemically react" refers to a change in chemical composition and not to a phase change from a liquid or solid to a gas. Many liquids can evaporate to form a gas at an elevated temperature. However, as used herein, the gas generating compound does not refer to a liquid that evaporates at the elevated temperature. Instead, the gas generating compound undergoes a chemical reaction to form a different compound. The product of this chemical reaction can be a gas, and the gas can remain in a gaseous state even after cooling to room temperature. In some examples, the chemical reaction of the gas generating compound can proceed without any other reactants (apart from the gas generating compound). In some examples, the gas generating compound can chemically decompose to form smaller molecules, and the smaller molecules can include a gas.

In some examples, the gas generating compound may be any compound that chemically reacts at an elevated temperature to generate a gas. In some examples, the gas generating compound may be any compound that reacts at an elevated temperature to generate multiple gaseous compounds. In some examples, the gas generating compound may be selected from carbohydrazide, urea, a urea homologue, a carbamide-containing compound, a carbonate (e.g., ammonium carbonate), a bicarbonate (e.g., sodium bicarbonate, potassium bicarbonate, or ammonium bicarbonate), a nitrate (e.g., ammonium nitrate), a nitrite (e.g., ammonium nitrite), and combinations thereof. As used herein, a "urea homologue" may be an alkylurea or dialkylurea, such as methylurea and dimethylurea. In some examples, the alkyl group in the alkylurea or dialkylurea may be a C1 to C6 alkyl group. These compounds can decompose to form a gas when heated to a decomposition temperature. In some examples, the gas can include ammonia and/or carbon dioxide.

In some examples, the gas generating compound can react to form a gas at a temperature that is reached during the 3D printing process. In some examples, the temperature at which the gas generating compound reacts can be from about 100° C. to about 250° C., for example, from about 120° C. to about 200° C., from about 130° C. to about 150° C., from about 150° C. to about 250° C. or from about 190° C. to about 240° C. In some examples, the temperature at which the gas generating compound reacts is at or below the melting or softening temperature of the particles, for example, polymer particles, of the build material. For example, the temperature at which the gas generating compound reacts can be within 100° C., with 75° C., within 70° C., within 50° C., within 25° C., 20° C., within 15° C., or within 10° C. of the melting or softening temperature of the particles (e.g., polymer particles) of the build material.

In some examples, the temperature at which the gas generating compound reacts is up to 100° C. below the melting or softening temperature of the particles (e.g., polymer particles) of the build material, for example, up to 90° C. below, up to 85° C. below, up to 80° C. below, up to 75° C. below, up to 70° C. below, up to 50° C. below, up to 25° C. below, up to 15° C. below, or up to 10° C. below the melting or softening temperature of the particles (e.g., polymer particles). In some examples, the temperature at which the gas generating compound reacts is at least 5° C. below the melting or softening temperature of the particles (e.g., polymer particles) of the build material, for example, at least 10° C. below, at least 15° C. below, at least 20° C. below, at least 25° C. below, at least 30° C. below, at least 35° C. below, at least 40° C. below, at least 45° C. below, at least 50° C. below, at least 55° C. below, at least 60° C. below, at least 70° C. below the melting or softening temperature of the particles (e.g., polymer particles). In some examples, the temperature at which the gas generating compound reacts is from 5° C. to 100° C. below the melting or softening temperature of the particles (e.g., polymer particles) of the build material, for example, from 10° C. to 90° C. below, from 15° C. to 85° C. below, from 20° C. to 80° C. below, from 25° C. to 75° C. below, from 30° C. to 70° C. below the melting or softening temperature of the particles (e.g., polymer particles).

In some examples, the gas generating compound that is applied to the powder bed may react completely to form a gas when the build material is heated during fusing of the particles of the build material. In other words, all or nearly all of the gas generating compound can react to yield the gas. In some examples, a portion of the gas generating compound may react and another portion may remain unreacted. In some examples, from about 50 wt. % to about 100 wt. % of the gas generating compound may react, for example, from about 60 wt. % to about 95 wt. %, or from about 70 wt. % to about 90 wt. % of the gas generating compound may react. The proportion of the gas generating compound that reacts may depend on the temperature to which the build material is heated, the length of time that the build material is held at that temperature, the total amount of radiation energy applied to the build material, and so forth. Accordingly, in some examples, the amount of radiation energy applied, the length of time that the build material is heated, the temperature reached by the build material, the amount of fusing agent applied to the build material and other variables may affect extent of the reaction of the gas generating compound. These variables can be parts of the print mode of the three-dimensional printing method. Accordingly, the print mode can be adjusted to affect the amount of gas generating agent applied during the method (and thus the amount of gas generating compound contained therein that is applied).

Alternatively, the amount of gas generating compound applied to the build material can be changed by changing the concentration of gas generating compound in the gas generating agent. The amount of gas generating compound can be selected to allow the gas generating agent to be jettable from a fluid jet printhead. In some examples, the gas generating compound can be present in the gas generating agent in an amount of at least about 1 wt. % of the total weight of the gas generating agent, for example, at least about 5 wt. %, at least about 10 wt. %, at least about 15 wt. %, at least about 20 wt. %, at least about 25 wt. %, or at least about 30 wt. % of the gas generating agent. In some examples, the gas generating compound can be present in the gas generating agent in an amount of up to about 30 wt. % of the total weight of the gas generating agent, for example, up to about 25 wt. %, up to about 20 wt. %, up to about 15 wt. %, up to about 10 wt. %, or up to about 5 wt. % of the gas generating agent. In some examples, the gas generating compound can be present in the gas generating agent in an amount of from about 1 wt. % to about 30 wt. %, for example, from about 5 wt. % to about 25 wt. %, about 10 wt. % to about 20 wt. %, or about 10 wt. % to about 15 wt. % of the gas generating agent.

In some examples, the gas generating agent also comprises components to allow the gas generating agent to be jetted by a fluid jet printhead. In some examples, the gas generating agent can include jettability imparting ingredients. In some examples, the gas generating agent further comprises a component selected from a liquid vehicle, surfactant, dispersant, antimicrobial agents (e.g., biocides, fungicides, etc.), viscosity modifiers, materials for pH adjustment, sequestering agents, chelating agents, preservatives, and combinations thereof.

In some examples, the gas generating agent is soluble or dispersible in the liquid vehicle. In some examples, the liquid vehicle is water, an alcohol, an ether or a combination thereof. In some examples, the liquid vehicle, for example, the aqueous liquid vehicle, comprises a co-solvent. In some examples, the liquid vehicle comprises a co-solvent or co-solvents in an amount of from about 1 wt. % to about 50 wt. % of the total weight of the gas generating agent. In some examples, no co-solvent is present. The balance of the formulation can be purified water. In one example, the liquid vehicle can be predominantly water.

In some examples, the co-solvent may be a high boiling point co-solvent, for example, a co-solvent that boils at a temperature higher than the temperature of the build material during printing. In some examples, the high boiling point co-solvent has a boiling point above about 250° C. In some examples, the high boiling point co-solvent is present in the gas generating agent in an amount of from about 1 wt. % to about 15 wt. %, for example, from about 5 wt. % to about 10 wt. %.

In some examples, the co-solvent is an organic co-solvent. The organic co-solvent may be an aliphatic alcohol, aromatic alcohol, diol, glycol ether, polyglycol ether, lactam, caprolactam, formamide, acetamide, a long chain alcohol, or a combination thereof. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs (C6-C12) of polyethylene glycol alkyl ethers, lactams (e.g., C5 to C10 lactams, such as 2-pyrrolidinone), N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, triethylene glycol, tetraethylene glycol, 1,6-hexanediol, 1,5-hexanediol and 1,5-pentanediol.

In some examples, the surfactant may be a non-ionic, cationic, and/or anionic surfactant. In some examples, the surfactant may be a non-ionic organic surfactant. In some example, the surfactant can be present in an amount ranging from about 0.01 wt. % to about 5 wt. %.

In some examples, the surfactant may be an organic surfactant, for example, a non-ionic organic surfactant. In some examples, the surfactant may be an alkyl polyethylene oxide, alkyl phenyl polyethylene oxide, polyethylene oxide block copolymer, acetylenic polyethylene oxide, polyethylene oxide (di) ester, polyethylene oxide amine, protonated polyethylene oxide amine, protonated polyethylene oxide amide, dimethicone copolyol, substituted amine oxide, and the like. The amount of surfactant added to the gas generating agent may range from about 0.01 wt. % to about 20 wt. %. Suitable surfactants can include, but are not limited to, liponic esters such as Tergitol™ 15-S-12, Tergitol™ 15-S-7 available from Dow Chemical Company (Michigan), LEG-1 and LEG-7; Triton™ X-100; Triton™ X-405 available from Dow Chemical Company (Michigan); sodium dodecylsulfate; and Tegowet® 510 available from Evonik; secondary alcohol ethoxylates such as Tergitol™ 15-S-9 available from Sigma-Aldrich.

Examples of suitable antimicrobial agents include, but are not limited to, NUOSEPT® (Nudex, Inc., New Jersey), UCARCIDE™ (Union carbide Corp., Texas), VANCIDER (R.T. Vanderbilt Co., Connecticut), PROXEL® (ICI Americas, New Jersey), Acticide B20, Acticide M20, and combinations thereof.

In some examples, sequestering agents or chelating agents, such as EDTA (ethylene diamine tetra acetic acid), may be included to eliminate the deleterious effects of heavy metal impurities, and buffer solutions may be used to control the pH of the fluid. In some examples, the sequestering or chelating agents may comprise from about 0.01 wt. % to about 2 wt. % of the gas generating agent. Viscosity modifiers and buffers may also be present, as well as other additives to modify properties of the fluid as desired. Such additives can be present at from about 0.01 wt. % to about 20 wt. %.

In an example, the chelating agent is selected from the group consisting of methylglycinediacetic acid, trisodium salt; 4,5-dihydroxy-1,3-benzenedisulfonic acid disodium salt monohydrate; ethylenediaminetetraacetic acid (EDTA); hexamethylene-diamine tetra(methylene phosphonic acid), potassium salt; and combinations thereof. Methylglycinediacetic acid, trisodium salt ($Na_3MGDA$) is commercially available as TRILON® M from BASF Corp. 4,5-Dihydroxy-1,3-benzenedisulfonic acid disodium salt monohydrate is commercially available as TIRON™ monohydrate. Hexamethylene-diamine tetra(methylene phosphonic acid), potassium salt is commercially available as DEQUEST® 2054 from Italmatch Chemicals.

In some examples, the gas generating agent may comprise an anti-kogation agent, for example, oleth-3-phosphate, which is commercially available as CRODAFOS® O3A or CRODAFOS® N-3 acid from Croda.

In some examples, the gas generating agent may comprise a buffer, for example, 2-amino-2-(hydroxymethyl)-1,3-propanediol, which is commercially available as Trizma from Sigma-Aldrich.

Fusing Agent

The fusing agent can include a radiation absorber that can absorb radiant energy and convert the energy to heat. In certain examples, the fusing agent can be used with a powder bed material in a particular 3D printing process. A thin layer of powder build material can be formed, and then the fusing agent can be selectively applied to areas of the build material that are desired to be consolidated to become the body of the 3D printed screen. The fusing agent can be applied, for example, by printing such as with a fluid ejector or fluid jet printhead. Fluid jet printheads can jet the fusing agent in a similar way to an inkjet printhead jetting ink. Accordingly, the fusing agent can be applied with great precision to certain areas of the build material that are desired to form a layer of the body of the 3D printed screen. After applying the fusing agent, the powder build material can be irradiated with radiant energy. The radiation absorber from the fusing agent can absorb this energy and convert it to heat, thereby heating any polymer particles in contact with the radiation absorber. An appropriate amount of radiant energy can be applied so that the area of the powder build material that was printed with the fusing agent heats up enough to melt the polymer particles to consolidate the particles into a solid layer, while the powder build material that was not printed with the fusing agent remains as a loose powder with separate particles.

In some examples, the amount of radiant energy applied, the amount of fusing agent applied to the build material, the concentration of radiation absorber in the fusing agent, and the preheating temperature of the powder build material (i.e., the temperature of the powder build material prior to printing the fusing agent and irradiating) can be tuned to ensure that the portions of the powder build material printed with the fusing agent will be fused to form a solid layer and the other portions of the powder bed will remain a loose powder. These variables can be referred to as parts of the print mode of the 3D printing system. Generally, the print mode can include any variables or parameters that can be controlled during 3D printing to affect the outcome of the 3D printing process.

Generally, the process of forming a single layer by applying fusing agent and irradiating the build material can be repeated with additional layers of fresh build material to form additional layers of the 3D printed screen, thereby building up the final object one layer at a time. In this process, the build material surrounding the 3D printed screen can act as a support material for the screen. When the 3D printing is complete, the screen can be removed from the printer and any loose powder on the article can be removed.

Accordingly, in some examples, the fusing agent can include a radiation absorber that is capable of absorbing electromagnetic radiation to produce heat. The radiation absorber can be coloured or colourless. In various examples, the radiation absorber can be a pigment such as carbon black pigment, glass fiber, titanium dioxide, clay, mica, talc, barium sulfate, calcium carbonate, a near-infrared absorbing dye, a near-infrared absorbing pigment, a conjugated polymer, a dispersant, or combinations thereof. Examples of near-infrared absorbing dyes include aminium dyes, tetraaryldiamine dyes, cyanine dyes, pthalocyanine dyes, dithiolene dyes, and others. In further examples, the radiation absorber can be a near-infrared absorbing conjugated polymer such as poly(3,4-ethylenedioxythiophene)-poly(styrenesulfonate) (PEDOT:PSS), a polythio-phene, poly(p-phenylene sulfide), a polyaniline, a poly(pyrrole), a poly (acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. Non-limiting examples can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

In further examples, the radiation absorber can include a metal dithiolene complex. Transition metal dithiolene complexes can exhibit a strong absorption band in the 600 nm to 1600 nm region of the electromagnetic spectrum. In some examples, the central metal atom can be any metal that can form square planar complexes. Non-limiting specific examples include complexes based on nickel, palladium, and platinum.

In some examples, a dispersant can be included in the fusing agent. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly(ethylene glycol) p-isooctylphenyl ether, sodium polyacrylate, and combinations thereof.

The amount of radiation absorber in the fusing agent can vary depending on the type of radiation absorber. In some examples, the concentration of radiation absorber in the fusing agent can be from about 0.1 wt. % to about 20 wt. %. In one example, the concentration of radiation absorber in the fusing agent can be from about 0.1 wt. % to about 15 wt. %. In another example, the concentration can be from about 0.1 wt. % to about 8 wt. %. In yet another example, the concentration can be from about 0.5 wt. % to about 2 wt. %. In a particular example, the concentration can be from about 0.5 wt. % to about 1.2 wt. %. In one example, the radiation absorber can have a concentration in the fusing agent such that after the fusing agent is jetted onto the build material, the amount of radiation absorber in the build material can be from about 0.0003 wt. % to about 10 wt. %, or from about 0.005 wt. % to about 5 wt. %, with respect to the weight of the build material (e.g., the polymer powder).

In some examples, the fusing agent can be jetted onto the build material using a fluid jetting device, such as inkjet printing architecture. Accordingly, in some examples, the fusing agent can be formulated to give the fusing agent good jetting performance. Ingredients that can be included in the fusing agent to provide good jetting performance can include a liquid vehicle. Thermal jetting can function by heating the fusing agent to form a vapor bubble that displaces fluid around the bubble, and thereby forces a droplet of fluid out of a jet nozzle. Thus, in some examples the liquid vehicle can include a sufficient amount of an evaporating liquid that can form vapor bubbles when heated. The evaporating liquid can be a solvent such as water, an alcohol, an ether, or a combination thereof.

In some examples, the fusing agent formulation can include a co-solvent or co-solvents present in total at from about 1 wt. % to about 50 wt. %, depending on the jetting architecture. Further, a non-ionic, cationic, and/or anionic surfactant can be present, for example, in an amount ranging from about 0.01 wt. % to about 5 wt. % of the fusing agent. In some examples, the surfactant can be present in an amount from about 1 wt. % to about 5 wt. %. The liquid vehicle can include dispersants in an amount from about 0.5 wt. % to about 3 wt. %. The balance of the formulation can be purified water. In one example, the liquid vehicle can be predominantly water.

In some examples, the fusing agent can additionally comprise other components such as biocides, viscosity modifiers, materials for pH adjustment, sequestering agents, preservatives, and the like. These components can be included in any of the amounts described above in relation to the gas generating agent.

In some examples, a water-dispersible or water-soluble radiation absorber can be used with an aqueous vehicle. Because the radiation absorber is dispersible or soluble in water, an organic co-solvent may not be present, as it may not be included to solubilize the radiation absorber. Therefore, in some examples the fluids can be substantially free of organic solvent, e.g., predominantly water. However, in other examples a co-solvent can be used to help disperse other dyes or pigments, or enhance the jetting properties of the respective fluids. In still further examples, a non-aqueous vehicle can be used with an organic-soluble or organic-dispersible fusing agent.

In certain examples, a high boiling point co-solvent can be included in the fusing agent. The high boiling point co-solvent can be an organic co-solvent that boils at a temperature higher than the temperature of the build material during printing. In some examples, the high boiling point co-solvent can have a boiling point above about 250° C. In still further examples, the high boiling point co-solvent can be present in the fusing agent at a concentration from about 1 wt. % to about 4 wt. %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs (C6-C12) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Detailing Agent

In some examples, a detailing agent may also be used in the method of 3D printing a screen. The detailing agent can include a detailing compound that is capable of reducing the temperature of the build material onto which the detailing agent has been applied. In some examples, the detailing agent may be applied (e.g., ejected) around the edges of the portion of the build material on which the fusing agent has been/is applied. The detailing agent can increase selectivity between the fused and unfused portions of the build material by reducing the temperature of the build material around the edges of the portion to be fused.

In some examples, the detailing compound can be a solvent that evaporates at the temperature of the build material. In some cases, the build material can be preheated to a preheat temperature within about 10° C. to about 70° C. of the fusing temperature of the build material. Depending on the type of build material used, the preheat temperature can be in the range of about 90° C. to about 200° C. or more. The detailing compound can be a solvent that evaporates when it comes into contact with the build material at the preheat temperature, thereby cooling the printed portion of the build material through evaporative cooling. In certain examples, the detailing agent can include water, co-solvents, or combinations thereof. Non-limiting examples of co-solvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-methoxy-3-methyl-1-butanol, isobutyl alcohol, 1,4-butanediol, N,N-dimethyl acetamide, and combinations thereof. In some examples, the detailing agent can be mostly water. In a particular example, the detailing agent can be about 85 wt. % water or more. In further examples, the detailing agent can be about 95 wt. % water or more. In still further examples, the detailing agent can be substantially devoid of radiation absorbers. That is, in some examples, the detailing agent can be substantially devoid of ingredients that absorb enough radiation energy to cause the powder to fuse. In certain examples, the detailing agent can include colorants such as dyes or pigments, but in small enough amounts that the colorants do not cause the powder printed with the detailing agent to fuse when exposed to the radiation energy.

The detailing agent can also include ingredients to allow the detailing agent to be jetted by a fluid jet printhead. In some examples, the detailing agent can include jettability imparting ingredients such as those in the fusing agent and/or the gas generating agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

Build Material

The build material may be any powder material suitable for use in a 3D printer. In some examples, the build material may be a polymer powder.

In some examples, the build material includes polymer particles having a variety of shapes, such as substantially spherical particles or irregularly-shaped particles.

In some examples, the build material is capable of being formed into 3D printed objects with a resolution of about 20 μm to about 100 μm, about 30 μm to about 90 μm, or about 40 μm to about 80 μm. As used herein, "resolution" refers to the size of the smallest feature that can be formed on a 3D printed object. The powder build material can form layers from about 20 μm to about 100 μm thick, allowing the fused layers of the printed object to have about the same thickness. This can provide a resolution in the z-axis (i.e., depth) direction of about 20 μm to about 100 μm. The powder build material can also have a sufficiently small particle size and sufficiently regular particle shape to provide about 20 μm to about 100 μm resolution along the x-axis and y-axis (i.e., the axes parallel to the top surface of the build material). For example, the powder build material can have an average particle size from about 20 μm to about 100 μm, for example, from about 20 μm to about 50 μm. Other resolutions along these axes can be from about 30 μm to about 90 μm or from 40 μm to about 80 μm.

The polymer build material can have a melting or softening point from about 70° C. to about 350° C., for example, from about 150° C. to about 200° C. A variety of thermoplastic polymers with melting points or softening points in these ranges can be used. For example, the polymer powder can be polyamide 6 powder, polyamide 9 powder, polyamide 11 powder, polyamide 12 powder, polyamide 6,6 powder, polyamide 6,12 powder, polyethylene powder, wax, thermoplastic polyurethane powder, acrylonitrile butadiene styrene powder, amorphous polyamide powder, polymethylmethacrylate powder, ethylene-vinyl acetate powder, polyarylate powder, silicone rubber, polypropylene powder, polyester powder, polycarbonate powder, copolymers of polycarbonate with acrylonitrile butadiene styrene, copolymers of polycarbonate with polyethylene terephthalate polyether ketone powder, polyacrylate powder, polystyrene powder, or mixtures thereof. In a specific example, the polymer powder can be polyamide 11, which can have a melting point from about 185° C. to about 200° C.

The thermoplastic polymer particles can also in some cases be blended with a filler. The filler can include inorganic particles such as alumina, silica, fibers, carbon nanotubes, or combinations thereof. When the thermoplastic polymer particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polymer particles to filler particles can be from about 100:1 to about 1:2 or from about 5:1 to about 1:1.

3D Printed Screens

In Another Aspect, there is Provided a 3D Printed Screen for Molded Fibre product fabrication. The 3D printed screen may comprise a plurality of apertures through a fused build material, wherein the diameter or width of at least one of the apertures is 0.5 mm or less. In some examples, the 3D printed screen may comprise a plurality of apertures through a fused build material, wherein the diameter or width of the plurality of apertures is 0.5 mm or less.

Figure 4:
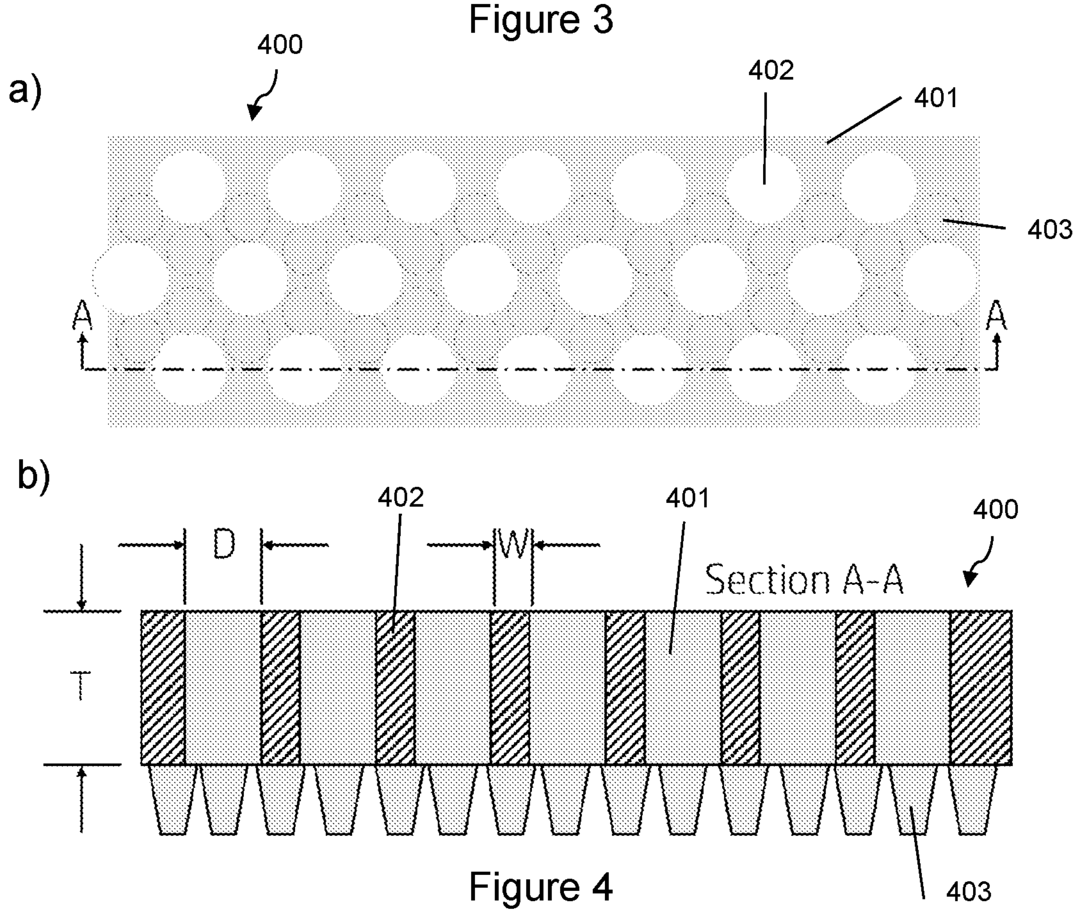
FIG. 4 is a diagram of an example screen for molded fibre product fabrication showing the various dimensions of the screen.

FIG. 4 depicts a) a top down view and b) a cross-section view (along line A-A) of part of a 3D printed screen (400) comprising a body (401) and a plurality of apertures (402). In some examples, the diameter or width of the apertures is the dimension labelled "D" in FIG. 4.

In some examples, the width of an aperture may be the shortest distance from one wall of the aperture through the centre of the aperture to the opposite wall. In some examples, the apertures may be noncircular in shape and the width may be the dimension of the aperture that corresponds to the smallest diameter of the aperture.

In some examples, the screen is a molded fibre product fabrication screen. In some examples, molded fibre product fabrication comprises passing a suspension comprising fibres through a screen to deposit the fibres on the screen and form a molded fibre product in the shape of the screen. In some examples, the screen is in contact with a mold that maintains the shape of the screen. In other examples, the screen may maintain its shape even in the absence of a mold. In some examples, the suspension comprising fibres is an aqueous suspension comprising fibres. In some examples, the fibres may be or comprise paper, wood, fibre crops, bamboo or the like. In some examples, the fibres may be recycled fibres, such as recycled paper. In some examples, the aqueous suspension comprising fibres may comprise fibres, water and additives, such as paraffin or a dye for colouring the fibres.

In some examples, the screen (e.g., the forming screen) may comprise protrusions (e.g., pillars) extending from the body of the screen to separate the screen from the mold (as shown in 403 in FIG. 4*b*, with the locations of the protrusions (403) identified in FIG. 4*a*). In some examples, the screen does not comprise the protrusions.

In some examples, molded fibre product fabrication comprises contacting a forming screen with a suspension (for example, a slurry) comprising fibres; applying a reduced pressure through the screen to contact fibres with the forming screen; removing the forming screen from contact with the suspension; contacting a transfer tool with the fibres deposited on the forming screen and transferring the fibres to a transfer tool, optionally by applying a reduced pressure through the transfer tool and/or an increased pressure through the forming screen. In some examples, the forming screen may be in contact with a forming mold.

In some examples, the transfer tool may comprise a mold through which holes have been drilled. In some examples, the transfer tool may comprise a 3D printed screen (i.e., transfer screen), for example, a 3D printed screen producible by a method described herein. In some examples, the shape of the forming screen complements the shape of the transfer tool. In some examples, the forming mold and the transfer mold, if present, comprise a body with apertures through the body and may also be produced by 3D printing. In some examples, the apertures through the body of the forming mold and/or the transfer mold are larger than the apertures through the body of the forming screen and/or the transfer screen respectively.

In some examples, the 3D printed screen for molded fibre product fabrication according to the examples described herein may be a forming screen or a transfer screen. In some examples, both a forming screen and a transfer screen may be produced by 3D printing. In some examples, the 3D printed screen may be a forming screen of a molded fibre tool set that also includes a forming mold. In some examples, the forming screen can be mounted to the forming mold. In some examples, the 3D printed screen may be a transfer screen of a molded fibre tool set that also includes a transfer mold. In some examples, the transfer screen can be mounted to the transfer mold.

Molded fibre products may be referred to as molded pulp products. Examples of molded fibre products include egg cartons, disposable drinks trays, packaging inserts or the like.

In some examples, at least one, optionally all, of the apertures through the body of the screen (i.e., the fused build material) has a diameter or width of about 0.6 mm or less, for example, about 0.55 mm or less, about 0.5 mm or less, about 0.49 mm or less, about 0.48 mm or less, about 0.47 mm or less, about 0.46 mm or less, about 0.45 mm or less, about 0.44 mm or less, about 0.43 mm or less, about 0.42 mm or less, or about 0.41 mm or less, about 0.4 mm or less, about 0.35 mm or less, about 0.3 mm or less, about 0.25 mm or less, about 0.2 mm or less, or about 0.15 mm or less, or about 0.1 mm or less. In some examples, at least one, optionally all, of the apertures through the body of the screen has a diameter or width of at least about 0.1 mm, at least about 0.15 mm, at least about 0.2 mm, at least about 0.25 mm, at least about 0.3 mm, at least about 0.35 mm, at least about 0.4 mm, or at least about 0.45 mm, at least about 0.5 mm, at least about 0.55 mm, or at least about 0.6 mm. In some examples, at least one, optionally all, of the apertures through the body of the screen has a diameter or width of from about 0.1 mm to about 0.6 mm, for example, about 0.2 mm to about 0.5 mm, about 0.15 mm to about 0.49 mm, about 0.2 mm to about 0.48 mm, about 0.25 mm to about 0.47 mm, about 0.3 mm to about 0.46 mm, about 0.35 mm to about 0.45 mm, or about 0.4 mm to about 0.45 mm.

In some examples, the 3D printed screen has a thickness, that is, the dimension perpendicular to the diameter or width of the apertures, of at least about 0.5 mm, for example, at least about 0.75 mm, at least about 1 mm, at least about 1.25 mm, at least about 1.5 mm, at least about 1.75 mm, or at least about 2 mm. In some examples, the 3D printed screen may have a thickness of up to about 2 mm, for example, up to about 1.75 mm, up to about 1.5 mm, up to about 1 mm, up to about 0.75 mm, or up to about 0.5 mm. In some examples, the 3D printed screen has a thickness of from about 0.5 mm to about 2 mm, for example, about 0.75 mm to about 1.75 mm, about 1 mm to about 1.5 mm, about 1 mm to about 1.2 mm, or about 1.25 mm to about 2 mm. In some examples, the thickness of the screen is the dimension labelled T in FIG. 4.

In some examples, the 3D printed screen may comprise a plurality of apertures in an array across the body of the screen. In some examples, the array of apertures may be a regular array in which the distance between each aperture and the adjacent apertures is the same. In some examples, the array of apertures may be an irregular array in which apertures are separated by different distances depending on the location of the aperture in the body of the screen. In some examples, the distance between the centres of two adjacent apertures in the array of apertures is the diameter or width of the apertures plus the web thickness, W (see FIG. 4). In some examples, the web thickness, W, is at least about 0.1 mm, for example, at least about 0.15 mm, at least about 0.2 mm, at least about 0.25 mm, at least about 0.3 mm, at least about 0.35 mm, at least about 0.4 mm, at least about 0.45 mm, at least about 0.5 mm. In some examples, the web thickness, W, is up to about 0.5 mm, for example, up to about 0.45 mm, up to about 0.4 mm, up to about 0.35 mm, up to about 0.3 mm, up to about 0.25 mm, up to about 0.2 mm, up to about 0.15 mm, up to about 0.1 mm. In some examples, the web thickness, W, is from about 0.1 mm to about 0.5 mm, for example, about 0.15 mm to about 0.45 mm, about 0.2 mm to about 0.4 mm, about 0.25 mm to about 0.35 mm, or about 0.1 mm to about 0.3 mm. During 3D printing of a screen, the greater the minimum distance between apertures, the greater the thermal mass of the body of the screen. A greater thermal mass may increase the temperature of the build material during 3D printing, resulting in increased thermal bleed, which may cause the build material inside the apertures to soften and/or melt even without the application of the fusing agent at an aperture location. Without wishing to be bound by theory, it is believed that the application of the gas generating agent may reduce thermal bleed into the apertures, allowing screens with increased web thicknesses to be created.

In some examples, the 3D printed screen may comprise any 3D printed screen obtained or obtainable by the method of three-dimensionally printing a screen described herein. In some examples, the 3D printed screen comprises a 3D printed screen obtained by or obtainable by a method of three-dimensionally (3D) printing a screen comprising generating build material layers on a build platform; selectively applying a fusing agent onto the build material layers based on a three-dimensional object model of the screen; selectively applying a gas generating agent onto the build material layers based on the three-dimensional object model of the screen; wherein the gas generating agent comprises a gas generating compound that chemically reacts at a temperature to generate a gas; and exposing the build material layers to energy to selectively treat the build material in contact with the fusing agent and form the body of the screen from a set of build material layers, thereby heating the gas generating compound to the temperature to generate the gas and form the apertures in the screen.

Computer Readable Media

Figure 5:
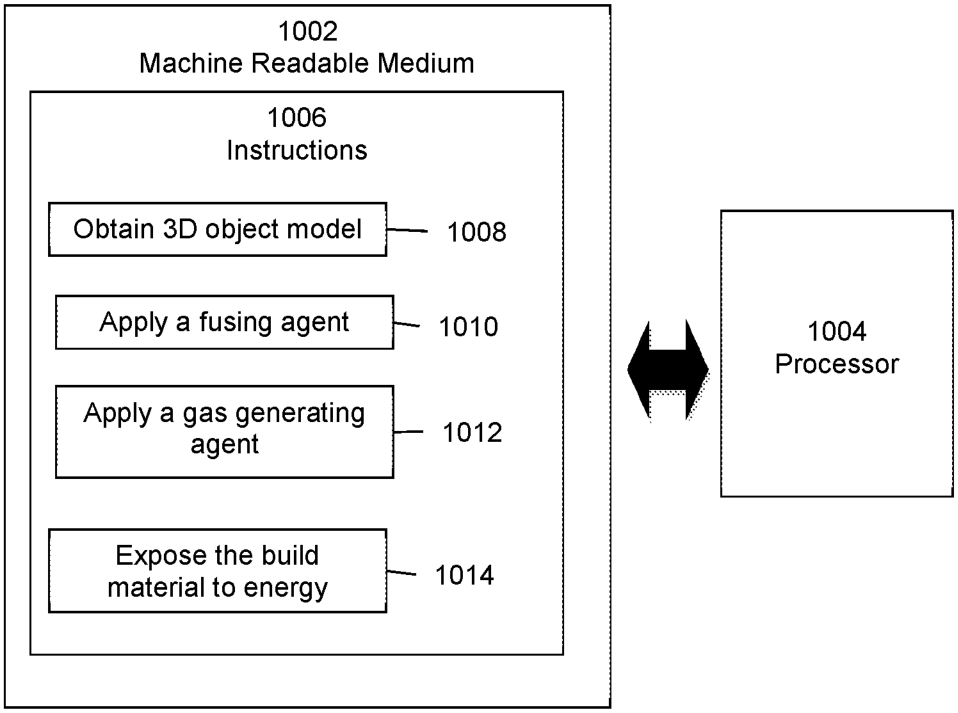
FIG. 5 is an example machine-readable medium.

In an aspect, there is provided a non-transitory computer readable medium on which is stored machine-readable instructions. FIG. 5 shows an example of a non-transitory computer readable medium (1002) on which is stored machine-readable instructions (1006) that, when executed by a processor (1004), cause the processor (10004) to obtain a three-dimensional object model of a screen for molded fibre product fabrication (1008), wherein the screen comprises a body and a plurality of apertures extending through the body; instruct a three-dimensional printing apparatus to apply a fusing agent onto a build material layer to form the body of the screen (1010) and to apply a gas generating agent onto the build material layer to form an aperture through the body (1012); wherein the gas generating agent comprises a gas generating compound that chemically reacts at a temperature to generate a gas; and instruct the three-dimensional printing apparatus to expose the build material layer to energy to selectively treat the build material in contact with the fusing agent and form the body of the screen from a set of build material layers, thereby heating the gas generating compound to the temperature to generate the gas and form the apertures in the screen (1014).

In some examples, the non-transitory computer readable medium on which is stored machine-readable instructions that, when executed by a processor, cause the processor to iteratively instruct a three-dimensional printing apparatus to apply a fusing agent onto a build material layer to form the body of the screen and to apply a gas generating agent onto the build material layer to form an aperture through the body.

In some examples, the non-transitory computer readable medium further comprises instructions that, when executed by a processor, cause the processor to identify apertures of the screen with a size below a threshold and determine the locations at which the gas generating agent should be applied to form the identified apertures. In some examples, the threshold may be the size of any apertures described herein, for example, the threshold may be apertures with a diameter or width of 0.5 mm or less.

In some examples, the non-transitory computer readable medium further comprises instructions that, when executed by a processor, cause the processor to determine the placement of a plurality of apertures in a digital object model of a product to be formed by a molded fibre fabrication process, wherein at least one (optionally, at least some or all) of the apertures have a size below a threshold, for example, a diameter or width of 0.5 mm or less. In some examples, the placement of the apertures may be determined to allow a fluid to pass through the apertures of the screen and allow the formation of the molded fibre product with a particular shape from a suspension of fibres in the fluid. In some examples, the placement of the plurality of apertures ensure an even distribution of fibres is deposited during molded fibre product fabrication.

In some examples, the non-transitory computer readable medium comprises instructions that further cause the processor to instruct the three-dimensional printing apparatus to apply a detailing agent onto the build material layer, wherein the detailing agent comprises a detailing compound that reduces the temperature of the build material onto which the detailing agent is applied.

In some examples, the non-transitory computer readable medium comprises instructions that cause the processor to instruct the 3D printing apparatus to perform any method of 3D printing described herein.

3D Printers

In another aspect, there is provided a three-dimensional printing apparatus, which may comprise the non-transitory computer readable medium described herein. In some examples, the 3D printing apparatus may comprise a 3D printer and a computer comprising the non-transitory computer readable medium described herein. In some examples, 3D printer may comprise the non-transitory computer readable medium described herein.

In some examples, the 3D printer may comprise a build platform, a build material applicator for applying a layer of build material onto the build platform, a fusing agent applicator for selectively applying a fusing agent onto a build material layer based on a 3D object model of the screen; a gas generating agent applicator for selectively applying a gas generating agent onto a build material layer; and a radiation source for exposing the build material layer to energy. In some examples, the 3D printer may be any 3D printer capable of performing the method described herein. In some examples, the fusing agent applicator may contain the fusing agent and/or the gas generating agent applicator may contain the gas generating agent. In some examples, the 3D printer may further comprise a detailing agent applicator for applying a detailing agent onto the build material layer and the detailing agent application may contain the detailing agent.

Examples in the present disclosure can be provided as methods, systems, or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine readable instructions.

The machine-readable instructions may, for example, be executed by a general purpose computer, a special purpose computer, an embedded processor or processors of other programmable data processing devices to realize the functions described in the description and diagrams. In particular, a processor or processing apparatus may execute the machine-readable instructions. Thus, functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Such machine-readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or block diagrams.

Further, the teachings herein may be implemented in the form of a computer software product, the computer software product being stored in a storage medium and comprising a plurality of instructions for making a computer device implement the methods recited in the examples of the present disclosure.

EXAMPLES

The following illustrates examples of the methods and other aspects described herein. Thus, these Examples should not be considered as limitations of the present disclosure, but are merely in place to teach how to make examples of the present disclosure.

Materials

Urea: a gas generating compound that decomposes into ammonia and carbon dioxide. The onset of decomposition occurs at about 130° C. with full decomposition occurring at around 350° C.

Tegowet® 510: a non-ionic organic surfactant (available from Evonik).

Crodafos O3A: oleth-2-phosphate (available from Croda Int).

Trilon M: methylglycinediacetic acid, trisodium salt ($Na_3MGDA$; available from BASF Corp.

2-Pyrrolidinone (2-P; available from Aldrich): 95 wt. % actives.

Triethylene glycol (3EG; available from Aldrich).

Tergitol 15-S-9: a linear non-ionic surfactant that is a secondary ethoxylated alcohol (available from Sigma-Aldrich).

Trizma: 2-amino-2-(hydroxymethyl)-1,3-propanediol; a buffer (available from Sigma-Aldrich).

Acticide B20: a glycol based benzisothiazolinone (20 wt. %); a biocide (available from Thor).

Acticide M20: 2-methyl-4-isothiazolin-3-one (20 wt. %); a biocide (available from Thor).

Puffer K dispersion Carbon black dispersion: a dispersion comprising carbon black (10 wt. %), a dispersant (<5 wt. %) and water.

Gas Generating Agent

The gas generating agent was produced by combining the gas generating compound with the components identified in Table 1.

TABLE 1

| Gas generating agent -MF | | wt. % active | wt. % |
|---|---|---|---|
| 2-Pyrrolidinone (2-P) | Co-solvent | 95 | 2.00 |
| Tergitol 15-S-9 | Non-ionic organic surfactant | 100 | 0.85 |
| Crodafos O3A | Anti-kogation agent | 100 | 0.50 |
| Trilon M (as is) | Chelating agent | 100 | 0.02 |
| Trizma | Buffer | 100 | 0.10 |
| Acticide B20 | Biocide | 100 | 0.18 |
| Acticide M20 | Biocide | 100 | 0.07 |
| Urea | Gas generating compound | 100 | 5 |
| Deionized $H_2O$ | Solvent | 100 | 91.28 |

Fusing Agent

The fusing agent was produced by combining a radiation absorber with the components identified in Table 2.

TABLE 2

| Fusing Agent | | wt. % active | wt. % |
|---|---|---|---|
| Puffer K dispersion Carbon black dispersion | Carbon black | 13 | 5 |
| 2-Pyrrolidinone (2-P) | Co-solvent | 95 | 19 |
| Triethylene glycol (3EG) | Co-solvent | 100 | 8 |
| Tegowet 510 | Non-ionic organic surfactant | 100 | 0.75 |
| Crodafos O3A | Anti-kogation agent | 100 | 0.45 |
| Acticide B20 | Stabilizer | 100 | 0.18 |
| Acticide M20 | Stabilizer | 100 | 0.14 |
| Trilon M | Chelating agent | 100 | 0.08 |
| Deionized water | Solvent | 100 | balance |

Example 1

A three-dimensionally printed screen for molded fibre product fabrication was produced by using an HP MultiJet Fusion 3D® printing test bed. An object model of a screen containing apertures with a width of 0.1 mm to 0.6 mm was used.

The 3D printer applied the fusing agent to areas of the build material layers that form the body of the screen and applied the gas generating agent to the areas of the build material layers that form the apertures in the screen. A screen with a body and apertures with a width of 0.1 mm to 0.6 mm was produced by this method.

While the invention has been described with reference to certain examples, those skilled in the art will appreciate that various modifications, changes, omissions, and substitutions can be made without departing from the spirit of the disclosure. It is intended, therefore, that the invention be limited by the scope of the following claims and their equivalents. Unless otherwise stated, the features of any dependent claim can be combined with the features of any of the other dependent claims and any of the independent claims.

The invention claimed is:

1. A method comprising:

for each of a plurality of build material powder layers in which a screen is to be formed, successively:

generating the build material powder layer:

selectively applying fusing agent onto the build material powder layer where build material powder is to be fused to form a body layer of a body of the screen, in accordance with an object model of the screen, wherein the fusing agent is absorptive to energy to fuse the build material powder to form the body layer;

selectively applying a gas generating agent onto the build material powder layer where apertures of the screen are to be formed in the body layer and that are to each extend from a bottom surface of the body to a top surface of the body, in accordance with the object model of the screen, wherein the gas generating agent comprises a gas generating compound that is chemically reactive at a temperature to generate a gas that displaces the build material powder to form the apertures in the body layer; and exposing the build material powder layer to the energy to:

form the body layer of the screen where the fusing agent has been applied, via the fusing agent absorbing the energy to fuse the build material powder, and form the apertures in the body layer where the gas generating agent has been applied, via the gas generating agent absorbing the energy to become heated and generate the gas, and the generated gas then displacing the build material powder from the body layer.

2. The method of claim 1, wherein the screen is used for molded fiber product fabrication.

3. The method of claim 1, further comprising identifying the apertures of the screen in the object model that have sizes less than a threshold, wherein the gas generating agent is applied onto the build material powder layer just where the apertures that the sizes of which are less than the threshold are to be formed.

4. The method of claim 1, wherein the gas generating compound is selected from carbohydrazide, urea, a urea homologue, a carbamide-containing compound, ammonium carbonate, ammonium nitrate, ammonium nitrite, or a combination thereof.

5. The method of claim 1, wherein the gas generating agent further comprises a liquid vehicle, a surfactant, an anti-kogation agent, a chelating agent, or a combination thereof, and/or wherein the fusing agent comprises a radiation absorber, a liquid vehicle, a surfactant, a chelating agent, or a combination thereof.

6. The method of claim 1, further comprising determining amounts of the gas generating agent and the fusing agent to apply based on the object model of the screen.

7. The method of claim 1, wherein the temperature at which the gas is generated is in a range of from about 100° C. to about 250° C.

8. The method of claim 3, wherein the temperature at which the gas generating agent is chemically reactive to generate the gas is a first temperature, wherein the method further comprises, for each of the plurality of build material powder layers, selectively applying detailing agent onto the build material powder layer where the apertures that the sizes of which are greater than the threshold are to be formed, wherein the detailing agent is evaporative at a second temperature to cool the build material powder to prevent fusing of the build material powder, and wherein the method further comprises removing the build material powder where the detailing agent has been applied and that has not fused, to form the apertures that the sizes of which are greater than the threshold.

9. A non-transitory computer-readable medium storing machine-readable instructions executable by a processor to perform processing comprising:

for each of a plurality of build material powder layers in which a screen is to be formed, successively:

causing an additive manufacturing apparatus to generate the build material powder layer;

causing the additive manufacturing apparatus to selectively apply fusing agent onto the build material powder layer where build material powder is to be fused to form a body layer of a body of the screen, in accordance with an object model of the screen, wherein the fusing agent is absorptive to energy to fuse the build material powder to form the body layer;

causing the additive manufacturing apparatus to selectively apply a gas generating agent onto the build material powder layer where apertures of the screen are to be formed in the body layer and that are to each extend from a bottom surface of the body to a top surface of the body, in accordance with the object model of the screen, wherein the gas generating agent comprises a gas generating compound that is chemically reactive at a temperature to generate a gas that displaces the build material powder to form the apertures in the body layer; and causing the additive manufacturing apparatus to expose the build material powder layer to the energy to:

form the body layer of the screen where the fusing agent has been applied, via the fusing agent absorbing the energy to fuse the build material powder, and form the apertures in the body layer where the gas generating agent has been applied, via the gas generating agent absorbing the energy to become heated and generate the gas, and the generated gas then displacing the build material powder from the body layer.

10. The non-transitory computer-readable medium of claim 9, wherein the screen is used for molded fiber product fabrication.

11. The non-transitory computer-readable medium of claim 9, wherein the processing further comprises identifying the apertures of the screen in the object model that have sizes less than a threshold, and wherein the gas generating agent is applied onto the build material powder layer just where the apertures that the sizes of which are less than the threshold are to be formed.

12. The non-transitory computer-readable medium of claim 9, wherein the gas generating compound is selected from carbohydrazide, urea, a urea homologue, a carbamide-containing compound, ammonium carbonate, ammonium nitrate, ammonium nitrite, or a combination thereof.

13. The non-transitory computer-readable medium of claim 9, wherein the gas generating agent further comprises a liquid vehicle, a surfactant, an anti-kogation agent, a chelating agent, or a combination thereof, and/or wherein the fusing agent comprises a radiation absorber, a liquid vehicle, a surfactant, a chelating agent, or a combination thereof.

14. The non-transitory computer-readable medium of claim 9, wherein the processing further comprises determining amounts of the gas generating agent and the fusing agent to apply based on the object model of the screen.

15. The non-transitory computer-readable medium of claim 9, wherein the temperature at which the gas is generated is in a range of from about 100° C. to about 250° C.

16. The non-transitory computer-readable medium of claim 11, wherein the temperature at which the gas generating agent is chemically reactive to generate the gas is a first temperature, wherein the processing further comprises, for each of the plurality of build material powder layers, causing the additive manufacturing apparatus to selectively apply detailing agent onto the build material powder layer where the apertures that the sizes of which are greater than the threshold are to be formed, wherein the detailing agent is evaporative at a second temperature to cool the build material powder to prevent fusing of the build material powder, and wherein the processing further comprises removing the build material powder where the detailing agent has been applied and that has not fused, to form the apertures that the sizes of which are greater than the threshold.

* * * * *